(12) United States Patent
Rogge et al.

(10) Patent No.: US 6,361,030 B1
(45) Date of Patent: Mar. 26, 2002

(54) ANTIVIBRATION MOUNT AND MECHANICAL ASSEMBLY COMPRISING SUCH MOUNT

(75) Inventors: Timothy Rogge, Rockford; Robert Goudie, Grand Haven, both of MI (US)

(73) Assignee: Hutchinson SA, Paris (FR)

( * ) Notice: Subject to any disclaimer, the term of this patent is extended or adjusted under 35 U.S.C. 154(b) by 0 days.

(21) Appl. No.: 09/255,094

(22) Filed: Feb. 22, 1999

(51) Int. Cl.⁷ ............................................... B60G 11/24
(52) U.S. Cl. .................. 267/140.13; 267/201; 267/292; 267/136
(58) Field of Search ....................... 267/140.11, 140.13, 267/141.1, 141.2, 141, 136, 152, 153, 201, 292; 248/560, 562, 638

(56) References Cited

U.S. PATENT DOCUMENTS

| | | | |
|---|---|---|---|
| 3,430,901 A | * 3/1969 | Cauvin | 248/638 |
| 4,270,625 A | * 6/1981 | Nishimura et al. | 180/291 |
| 4,826,142 A | * 5/1989 | Heynemann et al. | 267/140.1 |
| 4,930,758 A | * 6/1990 | Poirier | 269/292 |
| 4,987,679 A | * 1/1991 | Rau | 29/897.2 |
| 5,330,163 A | 7/1994 | Bodin et al. | |
| 6,129,328 A | * 10/2000 | Knurek et al. | 248/638 |

FOREIGN PATENT DOCUMENTS

| | | | |
|---|---|---|---|
| DE | 2537833 | * | 10/1977 |
| FR | 0887123 | * | 11/1943 |
| IT | 0476603 | * | 9/1953 |
| IT | 0497168 | * | 9/1955 |
| IT | 0632046 | * | 1/1962 |
| JP | 5837337 | * | 3/1983 |
| JP | 4312233 | * | 11/1992 |

* cited by examiner

Primary Examiner—Robert J. Oberleitner
Assistant Examiner—Melody M. Burch
(74) Attorney, Agent, or Firm—Marshall, Gerstein & Borun

(57) ABSTRACT

An antivibration mount to damp vibration in a main vibration direction, comprises first and second rigid strength members interconnected by an elastomer body. The first strength member includes first and second fingers which are substantially perpendicular to the main vibration direction and which extend outwards in opposite directions. The second rigid strength member includes first and second folded tabs which are perpendicular to the fingers and pierced by windows, the two fingers of the first rigid strength member passing through the windows.

1 Claim, 3 Drawing Sheets

ANTIVIBRATION MOUNT AND MECHANICAL ASSEMBLY COMPRISING SUCH MOUNT

FIELD OF THE INVENTION

The invention relates to antivibration mounts and methods for manufacturing these mounts. More particularly, the invention relates to an antivibration mount for interposing between two rigid elements to damp vibration therebetween, essentially in a main vibration direction, the mount comprising:
- first and second rigid strength members suitable for securing to respective ones of the two rigid elements to be united,
- an elastomer body interconnecting the two rigid strength members,
- and limitation means for limiting movements of the first and second strength members away from each other.

BACKGROUND OF THE INVENTION

Such a mount is described, for example, in document U.S. Pat. No. 5,330,163 in which the limitation means are constituted by a flexible ring which is passed around the first and second strength members.

In other known examples of antivibration mounts, the limitation means may be constituted by a rigid member such as a stem with enlarged foot, which is fixed to the first strength member and passes through the elastomer body and the second strength member with slack.

In all cases, the limitation means require at least an additional piece, which renders the mount more expensive and more difficult to manufacture.

OBJECTS AND SUMMARY OF THE INVENTION

A particular object of the present invention is to remedy these drawbacks by providing an antivibration mount of the kind in question which is simpler, cheaper and easier to manufacture than the known antivibration mounts.

To this end, according to the invention, the first strength member includes two fingers which are substantially perpendicular to the main vibration direction and which extend outwards in opposite directions, and the second rigid strength member includes first and second folded tabs which are substantially perpendicular to said fingers and pierced by windows, said two fingers of the first rigid strength member passing through said windows respectively to constitute thereby said limitation means.

In preferred embodiments of the invention, one may possibly have recourse in addition to one and/or other of the following arrangements:
- the second rigid strength member is a metal plate which is substantially U-shaped, with a basis and two integral lateral wings which constitute the tabs;
- the fingers are integral with the first strength member;
- elastomeric stops are secured to one element chosen from the group consisting in said first rigid strength member and said second rigid strength member, said stops cooperating with counter-abutment means for limiting relative movements of the first and second strength members away from each other;
- said stops are molded on the tabs of the second strength member and are oriented towards the first strength member so as to cooperate therewith;
- the second rigid strength member comprises at least one folded tongue and a single threaded pin, said tongue and said pin extending in a direction opposite to the direction of the first rigid strength member.

Another object of the present invention is a mechanical assembly comprising:
- a vehicle motor;
- a vehicle chassis;
- an antivibration mount to damp vibration between said motor and said chassis, essentially in a main vibration direction comprising first and second rigid strength members suitable for securing respectively to the vehicle motor and the vehicle chassis, an elastomer body interconnecting the two rigid strength members, and limitation means for limiting movements of the first and second strength members away from each other, wherein the first strength member includes first and second fingers which are substantially perpendicular to the main vibration direction and which extend outwards in opposite directions, and wherein the second rigid strength member includes first and second folded tabs which are substantially perpendicular to said fingers and pierced by windows, said two fingers of the first rigid strength member passing through said windows respectively to constitute thereby said limitation means;
- a motor bracket interconnecting the first strength member of the antivibration mount and the vehicle motor;
- wherein the first strength member includes a planar basis which extends in an oblique direction and which is interposed between the motor bracket and the elastomer body, said planar basis being extended by two parallel integral lugs which extend along the main vibration direction on each side of said basis and which are fixed to the motor bracket, and wherein the second strength element includes a planar basis which is fastened in contact with the vehicle chassis and which is substantially parallel to said first strength member.

The present invention also provides a method of manufacturing an antivibration mount as defined above, said method including the steps of:
a) molding the elastomer body between the first strength member and a rigid plate which is substantially planar in shape and which includes two free ends pierced by windows;
b) folding said free ends of the plate towards the first rigid strength member for engaging respectively said windows of the free ends of the plate on said fingers of the first strength member, said plate thus forming the second strength member after folding of said free ends, and said free ends thus forming the tabs of the second strength member after folding.

Advantageously, elastomeric stops are further molded on the free ends of the plate at the step a).

BRIEF DESCRIPTION OF THE DRAWINGS

Other characteristics and advantages of the invention appear from the following detailed description of three of its embodiments, given by way of non-limiting examples, and with reference to the accompanying drawings.

In the drawings.

In the various figures, the same references denote identical or similar elements.

The antivibration mount according to the invention is designed to be interposed between two rigid elements, for instance a vehicle motor and a vehicle chassis, in order to support the motor and to damp vibrations at least in a main vibration direction Z, generally vertical.

Figure 1:
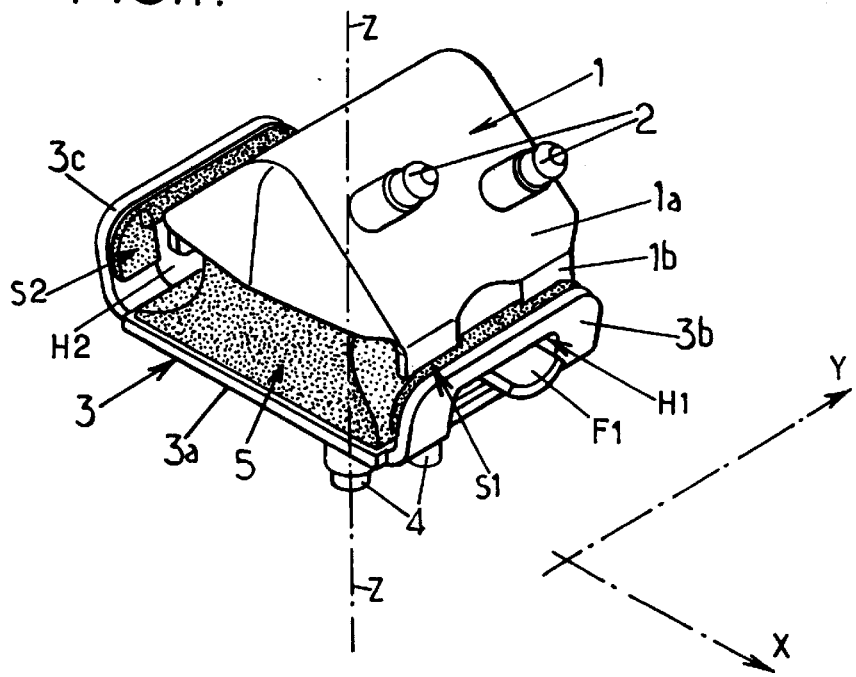
FIG. 1 is a perspective view of an antivibration mount according to a first embodiment of the invention.
Figure 2:
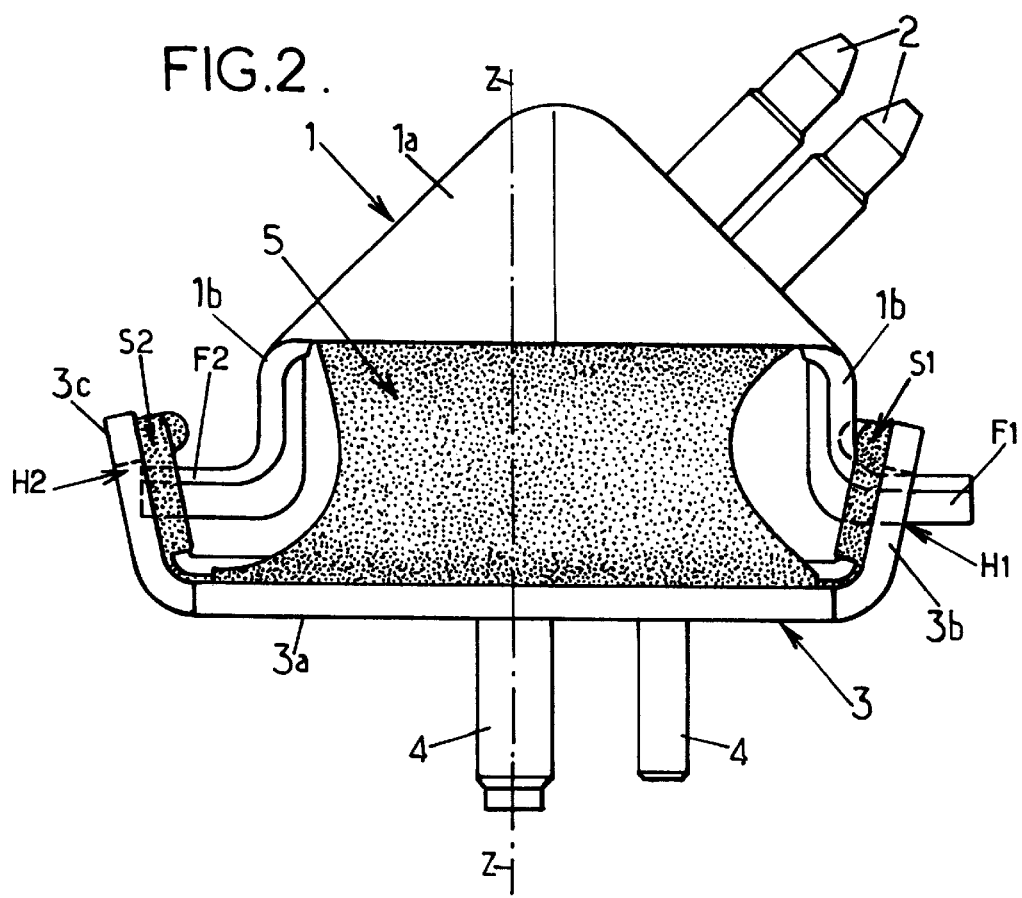
FIG. 2 is a face elevation view of the mount of FIG. 1.
Figure 3:
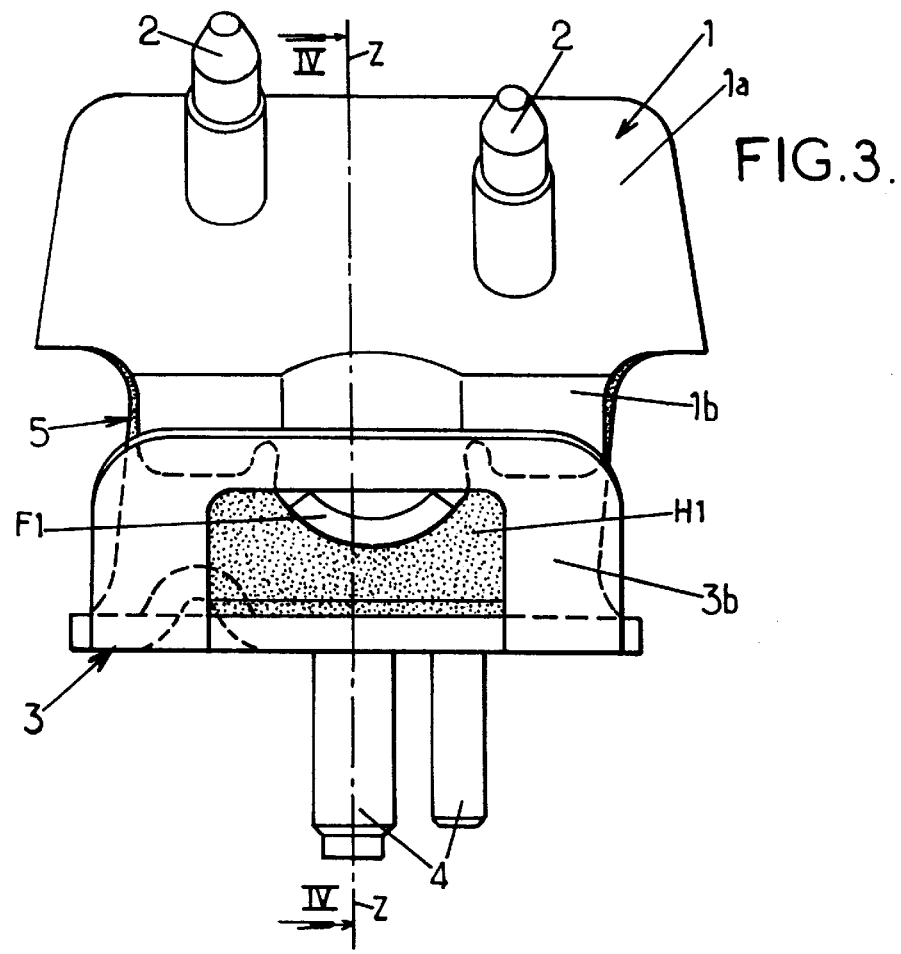
FIG. 3 is a side view of the mount of FIG. 1.

In the first embodiment of the invention, represented in FIGS. 1 to 3, the antivibration mount includes:

a first superior metal strength member 1 integral with two pins 2 projecting upwards;

a second inferior metal strength member 3 integral with two pins 4 projecting upwards;

and an elastomer body 5 constituted by a mass of rubber which is vertically interposed between the above-mentioned strength members and which is secured to said strength members by vulcanization.

The first strength member 1, in the example represented, is a rigid hood made of a folded plate which includes a superior portion 1a exhibiting a substantially V-shaped cross-section. Said superior portion 1a is opened in the direction of the second strength member 3 and is extended downwards by two vertical legs 1b. These legs 1b are themselves extended laterally by two respective central fingers F1 and F2 which are turned outwards in opposite directions and which extend along an axis X perpendicular to the direction Z.

The second strength member 3 is a folded metal plate which exhibits a substantially U-shaped cross-section. It includes a basis 3a which is generally plane in shape and which extends perpendicular to the direction Z, and two tabs 3b and 3c which extend in the direction of the fingers F1 and F2, substantially perpendicularly to them.

The tabs 3b, 3c are pierced respectively by windows H1 and H2 which are rectangular in shape and through which the fingers F1 and F2 of the first strength member 1 are passing respectively.

The fingers F1 and F2, as well as the windows H1 and H2, are arranged and sized, so that, in use:

the upper face of the fingers F1 and F2 may come into substantially vertical abutment against the upper inner edge of the respective windows H1 and H2 for limiting upward movements of exceptional amplitude of the first strength member 1, and the side edges of the fingers F1, F2 may come into abutment with the lateral edges of their respective window H1, H2 for limiting lateral movements of exceptional amplitude of the first strength member 1 along a horizontal axis Y which is perpendicular to axis X.

Further, the legs 1b of the first strength member may come into abutment with the tabs 3b, 3c for limiting movements of exceptional amplitude of the first strength member along axis X.

For these purposes, rubber stops S1 and S2 are molded and vulcanized respectively onto the inner face of the tabs 3b and 3c of the member 3, and preferably on the upper and side edges of the windows H1 and H2.

It will be observed that the stops S1 and S2 might possibly be secured to the legs 1b and fingers F1, F2, instead of being secured to the strength member 3.

For manufacturing the antivibration mount according to the invention, the method is advantageously as follows.

In a first step, the strength member 1 and a blank of strength member 3 are formed by cutting and folding and/or by pressing of metal plates.

Figure 4:
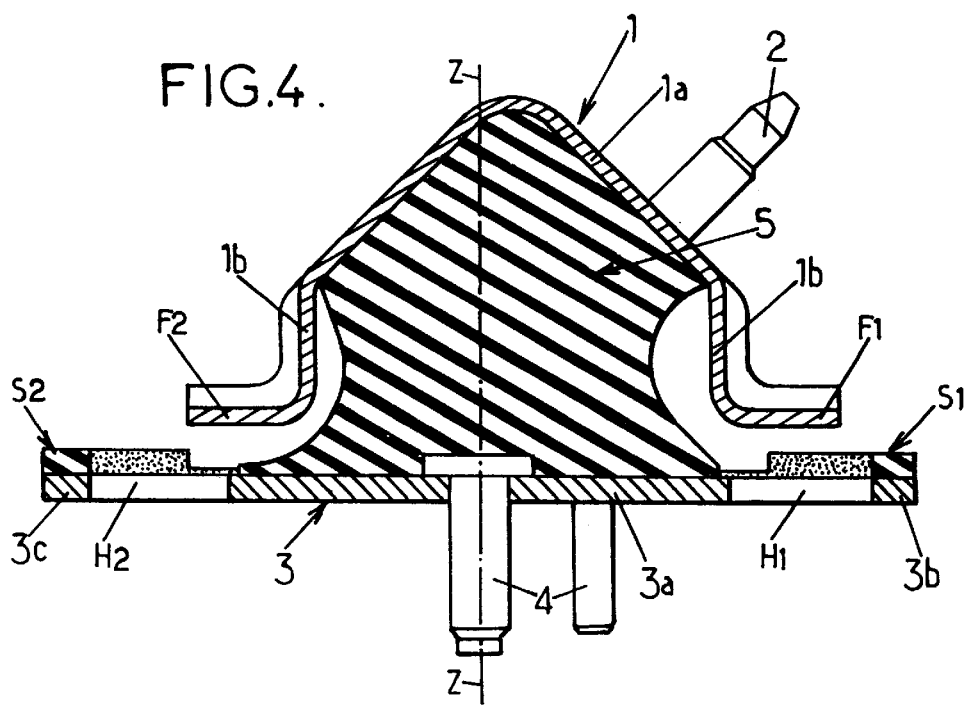
FIG. 4 is a section view taken along line IV—IV of FIG. 3, before folding of the tabs of the second strength member.

As shown in FIG. 4, the blank of strength member 3 is a substantially planar metal plate with two free ends 3b, 3c which are pierced by the windows H1, H2 and which are designed to constitute the tabs of the second strength member 3 after folding.

Then, in a second step, it is proceeded, on the one hand, to the molding of the elastomer body 5 between the strength members 1 and 3 and, on the other hand, to the molding of the stops S1 and S2 on the respective free ends 3b and 3c of the strength member 3. These two operations are preferably simultaneous. Finally, in a third step, the respective free ends 3b and 3c of the blank of strength member 3 are folded in the direction of the strength member 1 in order to obtain the antivibration mount, as shown in FIG. 1. During this folding, the windows H1, H2 are engaged on the fingers F1, F2.

The third step may be carried out while pressing the elastomer body so that before fitting the mount in a vehicle, the fingers F1, F2 bear on the upper edge of their respective window H1, H2, thus prestressing the elastomer body 5.

Figure 5:
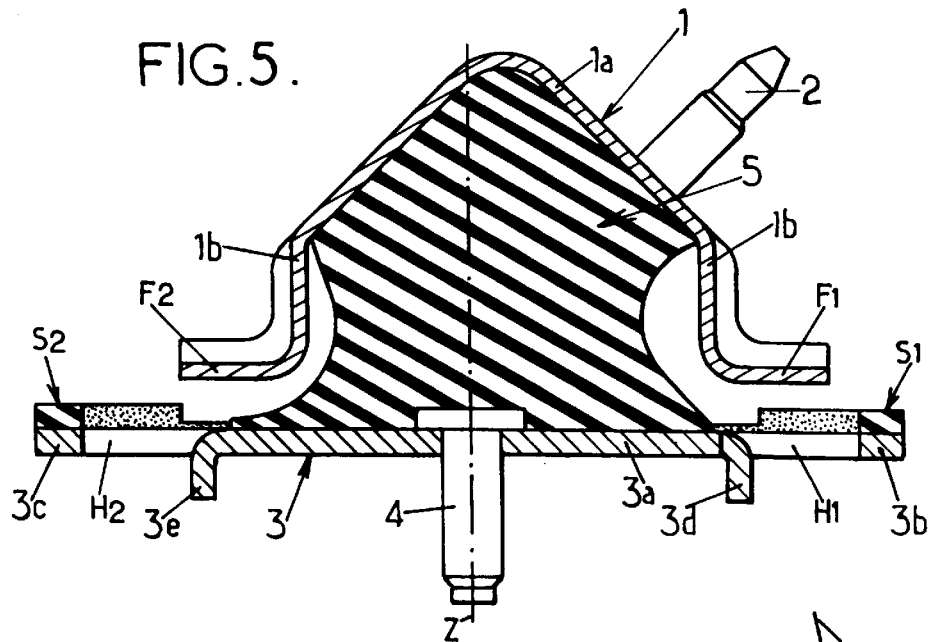
FIG. 5 is a section view similar to FIG. 4, in a second embodiment of the invention.

The second embodiment of the invention, represented in FIG. 5, includes many elements which are common to the first embodiment, and will therefore not be described in detail here. This second embodiment can be differentiated from the first embodiment by the fact that the second strength member 3 includes tongues 3d and 3e, as well as a single threaded pin 4 instead of two pins 4, which extend downwards from the basis 3a, along the direction Z. The tongues 3d, 3e are adapted to engage with one of the two rigid elements to be united, such as, for example, the vehicle chassis, in order to positively locate the second strength member 3 on said chassis while securing said member 3 on the chassis (for instance by screwing a nut on the pin 4).

The tongues 3d and 3e are integral with the basis 3a and are obtained by cutting said basis when forming the windows H1 and H2, and then by folding.

Figure 6:
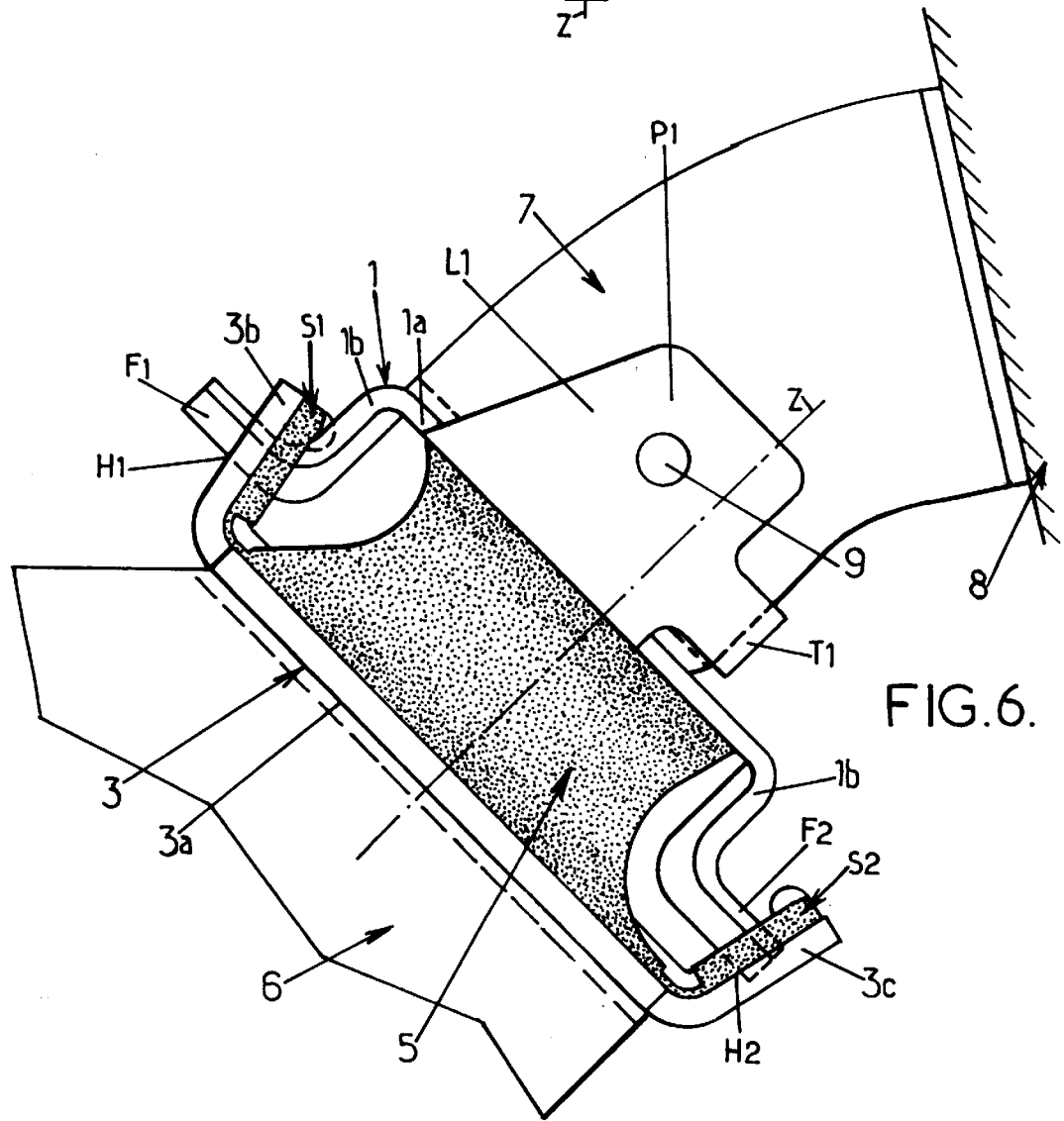
FIG. 6 is a schematic view of an antivibration mount according to a third embodiment of the invention which is shown in use position between a vehicle motor and a vehicle chassis.

The third embodiment of the invention, represented in FIG. 6, is similar to the first and second embodiments already described, and will therefore not be described in detail.

In this third embodiment, the antivibration mount has a shape adapted to be secured between a vehicle chassis 6 and a vehicle motor bracket 7. This motor bracket 7 includes an elongate main body, end faces of which are connected respectively to a vehicle motor 8 and to the strength member 1 of the antivibration mount. In the embodiment illustrated, said elongate body extends along an oblique direction Z (in which vibratory motion between the motor and the vehicle chassis is to be damped).

The strength member 1, in the example shown, includes an upper portion 1a exhibiting a substantially U-shaped cross-section. Said upper portion 1a is opened in the direction of the motor bracket 7, substantially perpendicular to the direction Z. The upper portion 1a includes:

a plane bottom or basis which extends in an oblique direction, which is interposed between the motor bracket 7 and the elastomer body 5 and which is in contact with the lower face of the elongate body of the motor bracket 7, and two opposite lateral extensions L1 (only one of which is shown) integral with the plane bottom, which constitute lugs so as to hold said elongate body.

The lugs L1 project from the sides of the strength member 1 which are deprived of fingers F1 and F2, and extend along the direction Z. Said lugs include respectively plane portions P1 which extend perpendicular to the plane bottom of the upper portion 1a and bear on respective sides of the elongate body of the motor bracket 7. These portions P1 are pierced by respective holes 9, said holes enabling the antivibration mount to be fastened to the motor bracket 7 by means of screws or bolts (not shown). Said lugs also include respectively tabs T1 which project from the respective portions P1, substantially perpendicular to respective sides of the elongate body of the motor bracket 7. Said tabs T1 are bent at their respective free ends just below the elongate body of the motor bracket 7 in order to hold it.

The strength member 3, similar to the first or second embodiment of the invention, has a basis 3a which is substantially parallel to the plane bottom of the first strength member 1, and is fastened, by the lower face of its main portion 3a, to the vehicle chassis 7 by fixing means (not shown), such as the pins 4 of the first embodiment or the pin 4 and the tongues 3d and 3e of the second embodiment.

The antivibration mounts according to the invention are very advantageous with regard to those known until now, particularly in that:

they have a very compact structure;

they are designed in such a way that molding of the elastomer body 5 and of the stops S1 and S2 is facilitated;

they produce a very cost-effective design because they are constituted by only two metal parts and do not require separate molding operations;

they supply a good motor retention, in the case of failure of the elastomer body 5, owing to the disposition of the fingers F1 and F2 of the strength member 1 which pass respectively through the windows H1 and H2;

they may be designed such that there is preload of the elastomer body 5 when the free ends 3b and 3c of the strength member 3 are turned up.

What is claimed is:

1. Mechanical assembly comprising:

a vehicle motor;

a vehicle chassis;

an antivibration mount to damp vibration between said motor and said chassis, essentially in a main vibration direction, said antivibration mount comprising first and second rigid strength members suitable for securing respectively to the vehicle motor and the vehicle chassis, an elastomer body interconnecting the two rigid strength members;

a motor bracket interconnecting the first strength member of the antivibration mount and the vehicle motor;

wherein the first strength member includes a folded metal plate having:

a planar basis which extends in an oblique direction and which is interposed between the motor bracket and the elastomer body, first and second legs which extend substantially parallel to the main vibration direction from said planar basis, toward the second strength member, said first and second legs being extended respectively by first and second fingers which are substantially perpendicular to the main vibration direction and which extend outwards in opposite directions, two parallel lugs which are integral with said planar basis and which extend along the main vibration direction on each side of said basis said two lugs being fixed to the motor bracket and being extended by two bent tabs which are bent around the motor bracket for holding said motor bracket, wherein the second rigid strength member includes a folded metal plate having:

a flat basis which is parallel to the planar basis of the first strength member, and first and second folded tabs which extend from said flat basis substantially perpendicular to said first and second fingers and which are pierced by windows, said first and second fingers of the first rigid strength member passing through said windows respectively for limiting movements of the first and second strength members away from each other.

* * * * *